P. N. JONES, F. R. PHILLIPS & J. W. WELSH.
DOUBLE DECK PASSENGER CAR.
APPLICATION FILED OCT. 26, 1910.

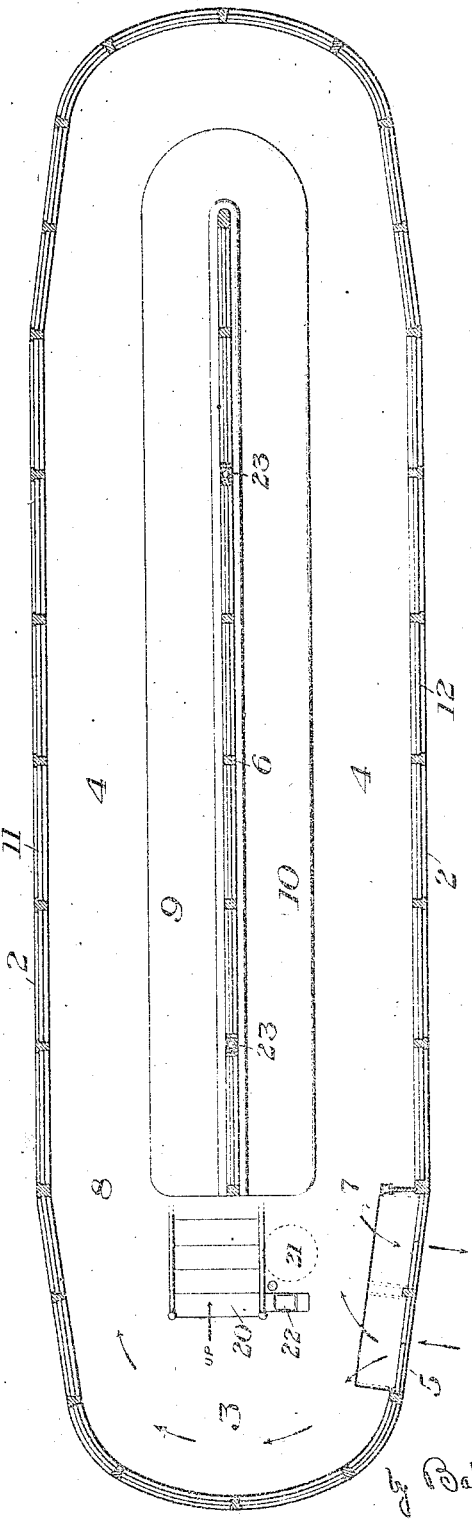

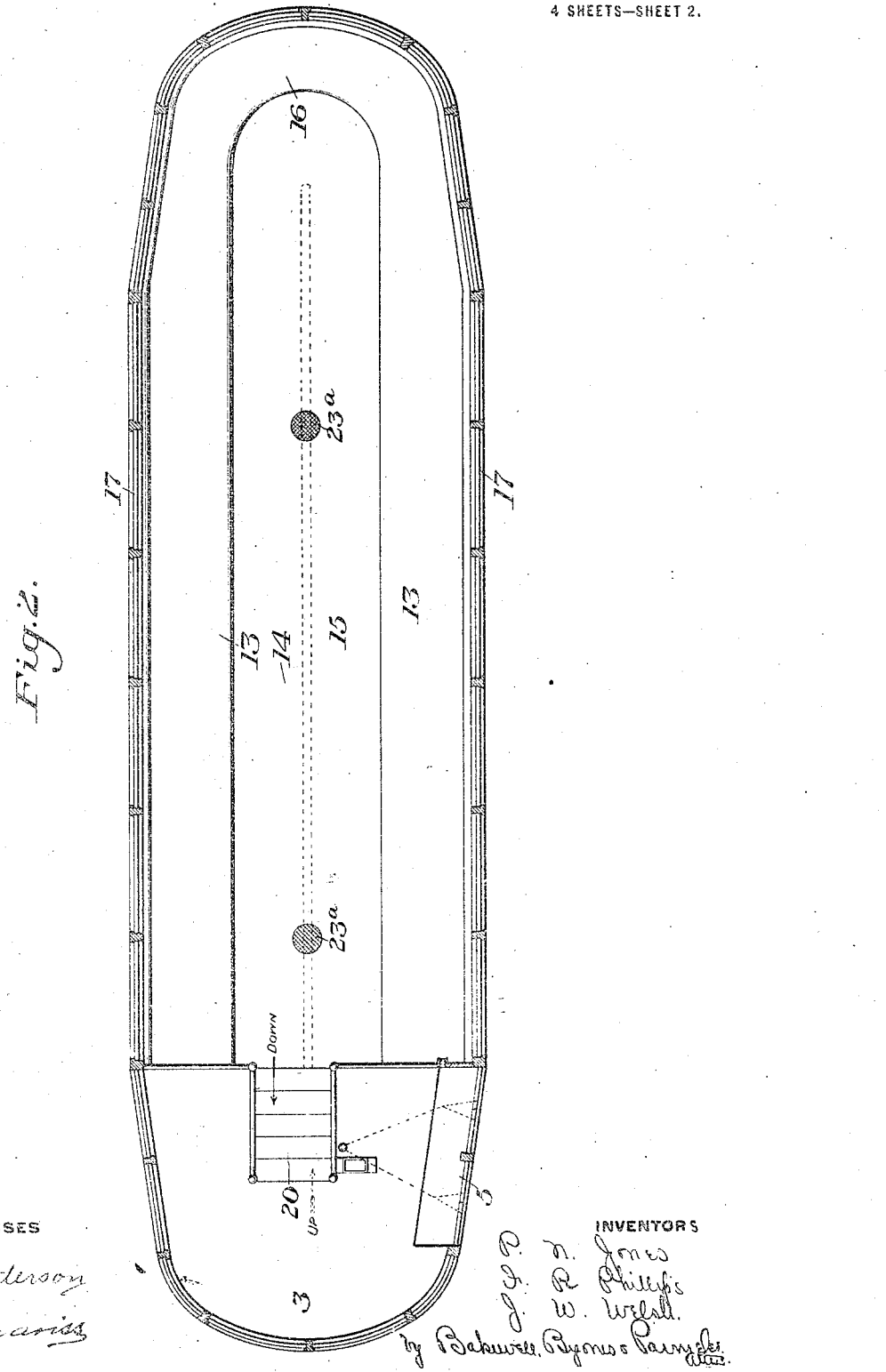

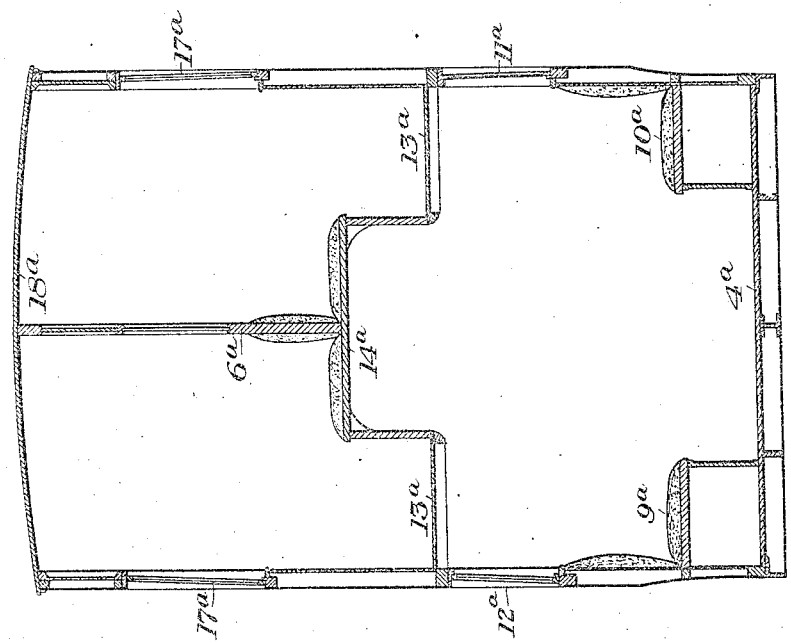
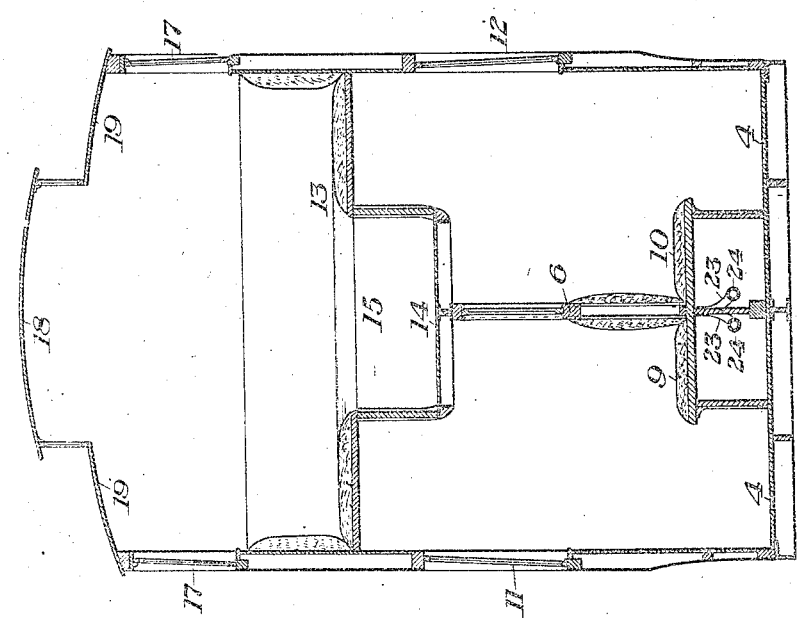

1,150,679.

Patented Aug. 17, 1915.
4 SHEETS—SHEET 4.

UNITED STATES PATENT OFFICE.

PEARL N. JONES, FRANK P. PHILLIPS, AND JAMES W. WELSH, OF PITTSBURGH, PENNSYLVANIA.

DOUBLE-DECK PASSENGER-CAR.

1,150,679.

Specification of Letters Patent.

Patented Aug. 17, 1915.

Application filed October 26, 1910. Serial No. 589,252.

*To all whom it may concern:*

Be it known that we, PEARL N. JONES, FRANK R. PHILLIPS, and JAMES W. WELSH, all residents of Pittsburgh, in the county of Allegheny and State of Pennsylvania, have invented a new Double-Decked Passenger-Car, of which the following is a full, clear, and exact description, reference being had to the accompanying drawings, forming part of this specification, in which—

Figure 5:
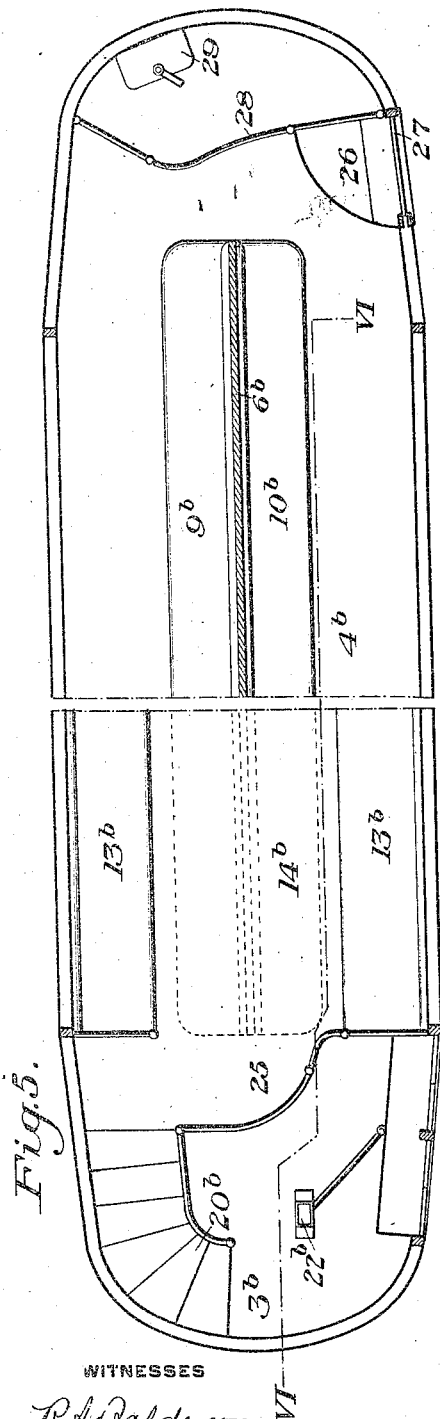
Figure 6:
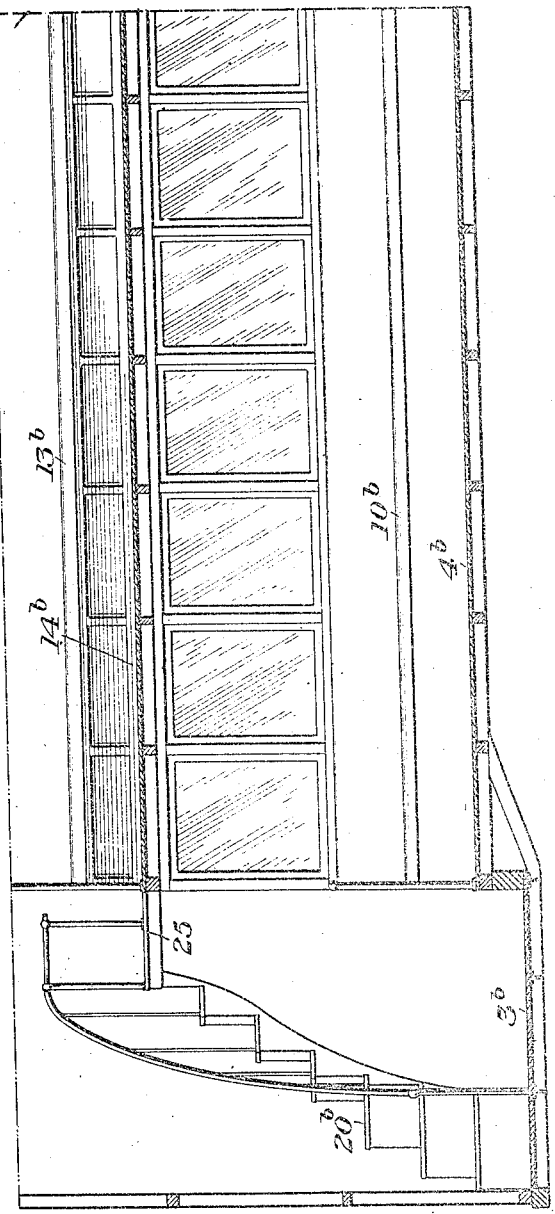

Figure 1 is a horizontal sectional view showing one form of our improved passenger car, illustrating the lower deck; Fig. 2 is a horizontal section at a higher level showing the upper deck arrangement; Fig. 3 is a vertical cross section of the form of Figs. 1 and 2; Fig. 4 is a cross section similar to Fig. 3, showing a modification; Fig. 5 is a top plan view partially in section, showing another form of the invention; and Fig. 6 is a partial sectional side elevation of the form of Fig. 5, the section being taken on the line VI—VI of said figure.

Our invention relates to passenger cars, particularly those adapted for street railway service.

The object of the invention is to greatly increase the seating capacity of such cars by making them double-decked, with seats at two different levels, without unduly increasing the height of the car body.

In street railway service there is a large demand for greater seating capacity, and this, of course, can be obtained by a double-decked arrangement of the car, but the equipment and arrangement of these street railways is usually such that the height of the car is limited by obstructions of various kinds, which prevent the ordinary double-decked cars being used.

Our invention is designed to overcome this difficulty and provide a double-decked car of relatively low height as compared with previous structures of this character.

To that end, the invention consists in arranging the seats on one deck in such a way that the passengers face in the opposite direction to those on the other deck. In other words, the heads of the seated passengers on one deck will be directly below the feet of the seated passengers on the other deck, the seats in one case preferably facing outwardly from the center of the car, while on the other deck they face inwardly toward the center of the car.

The invention also consists in certain constructions and arrangements of the parts to provide for this manner of sitting, as hereinafter more fully described and set forth in the claims.

In the drawings, referring to the forms of Figs. 1, 2 and 3, which show a trailer car without driving motors, 2 represents the car sides, 3 the rear platform which is preferably at the same level as the car floor, and 4 the lower floor or deck of the car. 5 indicates the entrance which is preferably provided with the door-operating mechanism shown in Patent No. 964,269 to Pearl N. Jones, dated July 12, 1910, although any ordinary entrance may be provided. The steps may also be arranged in any desirable way, as these portions form no part of the present invention. At the center of the car, we provide a dividing partition 6, which extends longitudinally from the openings 7 and 8 for entrance from the platform to the car body up to near the front end of the trailer. At each side of this partition are formed the seats 9 and 10 of the lower deck, the backs of which may form part of the partition 6. These seats face outwardly, so that the passengers may look through the side windows 11 and 12 in the lower body portion of the car. These seats preferably extend around the front end of the partition 6, in a trailer, thus enlarging the seating capacity at the front end. The upper deck or floor 13 of the car is provided with a central longitudinal lower portion 14, which is at a suitable distance below the portion 13, so that the passengers may sit on seats provided on the deck facing inwardly, while their feet rest in the depressed or pit portion 15, of which the floor 14 forms the bottom. This depressed deck portion 14 is above the heads of the passengers sitting on the seats 9 and 10, and is of suitable depth for the purpose desired.

As shown in Fig. 2, the seats 13 on the upper deck preferably extend the length of the car body and around the front end, as shown at 16, so that the passengers can sit close to each other around the sides and across the front of the car. 17 represents the side windows in the upper portion this portion also being inclosed, if desired, to protect the passengers. The top of the car may be provided with the usual raised roof portion 18, and the lower side portions 19, the portion 18 being sufficiently above the depressed floor portion 14 to allow passengers to stand therein, while when seated, their heads are under the lower roof portions 19. It will be seen that by this arrangement of facing the seats on one deck or floor outwardly and on the other deck inwardly, we are enabled to obtain a double-decked arrangement, without unduly increasing the height of the car, thus enabling such a car to be used on street railways already built and with the usual structures under which they pass. To reach the upper deck, a suitable stairway or stairways may be provided. In the form shown, the staircase 20 rises from an intermediate portion of the back platform 3, and thence extends upwardly to the depressed floor portion 14 of the upper deck. This stairway is preferably off center with the longitudinal center of the car body to give room for the conductor's station at 21 and a fare-box 22, if this is desired. By leading this stairway to the depressed portion of the upper deck, the passengers passing to this upper deck can walk along the floor portion 14, the roof 18 being of sufficient height above the floor to allow this. The partition 6 is a convenient structure for receiving heating flues which we have illustrated at 23. These flues may extend upwardly from pipes 24 which contain a heating fluid, such as hot air. This heating fluid may pass up through the partition to suitable registers 23$^a$ in the upper deck, thus heating both the upper and lower sections of the car. The heat may be supplied to these pipes from any desired source.

Instead of the arrangement shown in Figs. 1, 2 and 3, we may provide inwardly facing seats on the lower deck and outwardly facing seats on the upper deck, this being the reverse of the first form. This is shown in Fig. 4, wherein 9$^a$ and 10$^a$ are the lower seats extending along the sides of the car and facing inwardly, the portion 14$^a$ of the upper deck in this case being raised above the side portions 13$^a$ of the deck to a sufficient extent to provide outwardly facing seats on each side of the central longitudinal partition 6$^a$. In this case, however, the side portions of the roof 18$^a$ are raised, so that the roof is preferably of the form shown in Fig. 4. In this form, the passengers on the lower deck will walk through the central portion of the car, in which there is sufficient height to stand by reason of the raised portion 14$^a$ of the roof, while the stairway to the upper deck will lead to a side portion and hence the passengers will sit on the floor portions 13$^a$, which is provided with seats along each side of the central portion 6$^a$.

In Figs. 5 and 6, we show another form of stairway, a lower rear platform, and also the application of our system to a car carrying motors for driving the same. In this case, the rear platform 3$^b$ is preferably below the floor 4$^b$ of the car, the seating system in this case being the same as in the form of Figs. 1, 2 and 3. In this form, the staircase 20$^b$ leads upwardly on a curve or angle at the side of the platform remote from the entrance side. The upper part of this stairway is provided with a roof portion 25, leading into the central depressed portion 14$^b$ of the upper deck. In this case the seats 9$^b$ and 10$^b$ on the lower level, as shown in the right-hand portion of Fig. 5, together with the dividing partition 6$^b$, are stopped short of the front end of the car, to provide space for a series of steps, indicated at 26, with which a closing door 27 may or may not be provided, as desired. In this case, the motorman's station may be divided off by a railing, as shown at 28, 29 illustrating the motor controller. In this case, the depressing of the rear platform allows the stairway to extend in its upper portion over the heads of the passengers, passing into the lower body portion of the car.

The advantages of our invention will be obvious to those skilled in the art. A double-decked car is provided which is of much less height than ordinary double-decked cars; the seating capacity of the cars is greatly increased without abnormally increasing their height; old cars may be quickly and cheaply converted into cars of much greater seating capacity; provision is made on each floor for standing and walking, giving proper height for this purpose, while in the seating portions the cover or roof portion is lower than that over the passageways; and the central partition on one of the decks provides an efficient means for carrying heating pipes, if desired.

The car may, of course, be of the closed or open type; the stairway or stairways may be varied in position and arrangement, for instance, the stairway may lead up centrally of the longitudinal axis of the car, the steps at the upper level being cut away at the platform end to allow this; the partition between the outwardly facing seats may be omitted or may extend only part way to the roof; the car may be provided with platforms and stairways at both ends; the car structure may be used for either a trailer car or a motor car; and many other changes may be made in the form and arrangement of the car body, seats, etc., without departing from our invention.

We claim:

1. A double-decked passenger car having on its lower deck a centrally arranged longitudinally extending partition with oppositely facing seats for which the partition forms a back, and having at the upper deck side seats, said partition having flues therein opening to the upper deck between the side seats, substantially as described.

2. A double-decked passenger car having its lower deck provided with a centrally arranged longitudinal partition, with center seats arranged at each side of the partition, there being an aisle space between the seats at the side of the partition and the adjacent side of the car, the car having a side doorway at one end portion thereof with a depressed step-forming portion adjacent to said doorway and to which said aisle spaces lead, substantially as described.

3. A double-decked passenger car having its lower deck provided with a centrally arranged longitudinal partition, with center seats arranged at each side of the partition, there being an aisle space between the seats at the side of the partition and the adjacent side of the car, the car having a side doorway at one end portion thereof with a depressed step-forming portion adjacent to said doorway, one of said aisle spaces leading directly to said depressed portion, and the partition stopping short of the end of the car to form a passageway from the other aisle space to the said depressed portion, substantially as described.

In testimony whereof, we have hereunto set our hands.

PEARL N. JONES.
FRANK R. PHILLIPS.
JAMES W. WELSH.

Witnesses:
G. E. MILLER,
F. W. ERNST.